(12) United States Patent
De Clercq et al.

(10) Patent No.: US 7,362,774 B2
(45) Date of Patent: Apr. 22, 2008

(54) MULTIPROTOCOL LABEL SWITCHING LABEL DISTRIBUTION METHOD, A RELATED FIRST MULTIPROTOCOL LABEL SWITCHING NETWORK ELEMENT AND A RELATED SECOND MULTIPROTOCOL LABEL SWITCHING NETWORK ELEMENT

(75) Inventors: Jeremy De Clercq, Ghent (BE); Christian Marie Adelin Hublet, Lochristi (BE)

(73) Assignee: Alcatel, Paris (FR)

( * ) Notice: Subject to any disclaimer, the term of this patent is extended or adjusted under 35 U.S.C. 154(b) by 824 days.

(21) Appl. No.: 10/737,903

(22) Filed: Dec. 18, 2003

(65) Prior Publication Data
US 2004/0125805 A1 Jul. 1, 2004

(30) Foreign Application Priority Data
Dec. 26, 2002 (EP) .................................. 02293244

(51) Int. Cl.
*H04J 3/16* (2006.01)
*H04J 3/22* (2006.01)

(52) U.S. Cl. .................................................... 370/466
(58) Field of Classification Search ................ 370/464, 370/465, 466, 467, 401, 384
See application file for complete search history.

(56) References Cited

U.S. PATENT DOCUMENTS

| 5,920,705 | A  * | 7/1999  | Lyon et al. ............... 709/240 |
| 6,611,532 | B1 * | 8/2003  | Madour et al. ............ 370/466 |
| 6,721,316 | B1 * | 4/2004  | Epps et al. ............... 370/389 |
| 6,973,057 | B1 * | 12/2005 | Forslow .................... 370/328 |
| 7,061,911 | B2 * | 6/2006  | Furuno ..................... 370/392 |
| 7,088,718 | B1 * | 8/2006  | Srivastava ................. 370/392 |
| 2001/0019554 | A1 |  9/2001 | Chugo et al. |
| 2002/0003797 | A1 * | 1/2002 | Rautenberg ............... 370/389 |
| 2002/0110119 | A1 * | 8/2002 | Fredette et al. ........... 370/389 |
| 2002/0181457 | A1 * | 12/2002 | Mezeul et al. ........... 370/389 |
| 2003/0012188 | A1 * | 1/2003 | Zelig et al. ............... 370/389 |

FOREIGN PATENT DOCUMENTS

EP 0 896 494 A 2/1999

OTHER PUBLICATIONS

E. Rosen: "Internet Engineering Task Force (IETF) Request for comments with title "Multiportocol Label Switching Architecture" with Reference RFC 3031", CISCO Systems, Inc., published on Jan. 2001, pp. 1-50.

* cited by examiner

*Primary Examiner*—Ajit Patel
(74) *Attorney, Agent, or Firm*—Sughrue Mion, PLLC

(57) ABSTRACT

The present invention relates to a Label distribution method for distributing a label between a first Multi-protocol Label Switching (MPLS) network element and a second peering MPLS network element in an MPLS network. The first MPLS network element adds an unused label to the first data-packet DP1 of the at least one data-packet of the single flow before forwarding the at least one data-packet of the single flow, the unused label not yet associated with or used for identifying a context of said single flow. The second MPLS network element subsequently determines a context for the unknown label retrieved from the data-packets, using a predetermined algorithm. The second MPLS element then couples the unused label and the context determined using the predetermined algorithm.

9 Claims, 2 Drawing Sheets

MULTIPROTOCOL LABEL SWITCHING LABEL DISTRIBUTION METHOD, A RELATED FIRST MULTIPROTOCOL LABEL SWITCHING NETWORK ELEMENT AND A RELATED SECOND MULTIPROTOCOL LABEL SWITCHING NETWORK ELEMENT

The present invention relates to a Label distribution method as described in the preamble of claim 1 and related Network Elements as described in the preamble of claims 3 and 5.

Such a method and related Network Elements are already known in the art, e.g. from *"Internet Engineering Task Force (IETF) Request for comments with title "Multiprotocol Label Switching Architecture" with reference RFC 3031"* edited by E. Rosen of Cisco Systems, INC and published in January 2001".

Therein, a Multiprotocol Label switching architecture, further referred to as MPLS architecture, is disclosed. Such an architecture comprises a packet-switched network built up of a plurality of interconnected Label Switch Routers wherein packet forwarding between two MPLS Label Switch Routers in this architecture is executed based on a label dedicated to each packet of a data-flow. A MPLS Label Switched Router will normally only be able to process MPLS packets that contain labels that it has distributed earlier to the sender of the packet. As such the receiving node knows what the label 'means', the label identifying the context, called the Forward Equivalence Class FEC, where the context is a representation of a group of packets that share the same requirements for their transport. All packets in such a group are provided the same treatment on the route to the destination. Such a context may be a destination, a Point-to-Point Protocol-session, a Virtual Private Network or an Internet Service Provider/network. Such a label used to forward traffic between and through the Label Switch Routers has to be agreed upon by both peering Label Switch Routers. This Agreement is achieved by using a procedure, called a signalled Label Distribution procedure, by which one Label Switch Router informs another peering Label Switch Router of label bindings it intends to make. This signalled Label Distribution procedure, by which Label Switch Routers distribute labels to support MPLS forwarding along normally routed paths may be implemented using a signalled label distribution via the Label distribution Protocol (LDP), or even different protocols, for instance the Resource Reservation Protocol with Extensions for Traffic Engineering (RSVP-TE) or the Border Gateway Protocol (BGP) as defined in RFC3107.

These Label distribution protocols require a number of signalling messages. In these protocols, there may be at first a label assignment request from an upstream Label switch Router to the Downstream Label switch Router and subsequently a label assignment as a reply of the Downstream Label switch Router to the upstream Label switch Router. The Downstream Label Switch Router may alternatively announce a Label for a Forward Equivalence Class FEC without explicit request from the Upstream Label Switch Router. This is called an 'unsolicited' label distribution with LDP.

Alternatively, the distribution of the labels may be performed by manual configuration of label-switching tables in each of the network elements. Of course this is not a cost-efficient solution due to the geographical distribution of the network elements involved in the update and because of the management effort required.

An object of the present invention is to provide a label distribution method and the related devices of the above known type but wherein the signalling involved in the label distribution is avoided.

According to the invention, this object is achieved by the label distribution method described in claim 1, the first Multiprotocol Label Switching Network Element as described in claim 3 and the second Multiprotocol Label Switching Network Element as described in claim 5.

Indeed, by determining by the second Network Element the context of the single flow of data-packets by applying a predetermined algorithm and at the same time retrieving an unused label, added to the data-packet by the first network element, from the first data-packet by the second Multiprotocol Label Switching network element the label information including the context is determined at the second Multiprotocol Label Switching network element.

Herein, the unused label is a label that is not yet assigned to and used for identifying the context of data-packets of another flow. The subsequent packets of the single flow also carry the same label as the first data-packet of the single flow. After the retrieving of the unused label, the context determined by applying a predetermined algorithm and the coupling of the two is held, the second network element knows that any subsequent data-packet carrying the unused label also carries the same context as the context determined by applying a predetermined algorithm.

An additional characteristic feature of the present invention is described in claim 2 and claim 4.

By memorizing, by the first Network Element, a coupling between the origin, that is the ingress of the single flow of data-packets and the unused label, for instance Label A, assigned to the packets of the flow of data-packets, a reverse flow of data-packets carrying the same label, Label A, may be forwarded from the second Network Element towards the first Network Element that will then be able to, based on the memorised coupling between the unused Label and the origin of the original flow, forward the reverse flow's data-packets towards the original sender of the flow of data-packets.

An embodiment of the present invention is described in claim 6.

The predetermined algorithm may be implemented by randomly assigning an output of the Second Multiprotocol Label Switching Network Element to the context.

An alternative embodiment of the present invention is described in claim 7.

The predetermined algorithm may be implemented by assigning an unused output of said Second Multiprotocol Label Switching Network Element (PE2) having the lowest interface-identifier to said context.

Another alternative embodiment of the present invention is described in claim 8.

The predetermined algorithm may be implemented by assigning an unused output of said Second Multiprotocol Label Switching Network Element (PE2) by using a User-to-Network-Interface Protocol to said context.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 1:
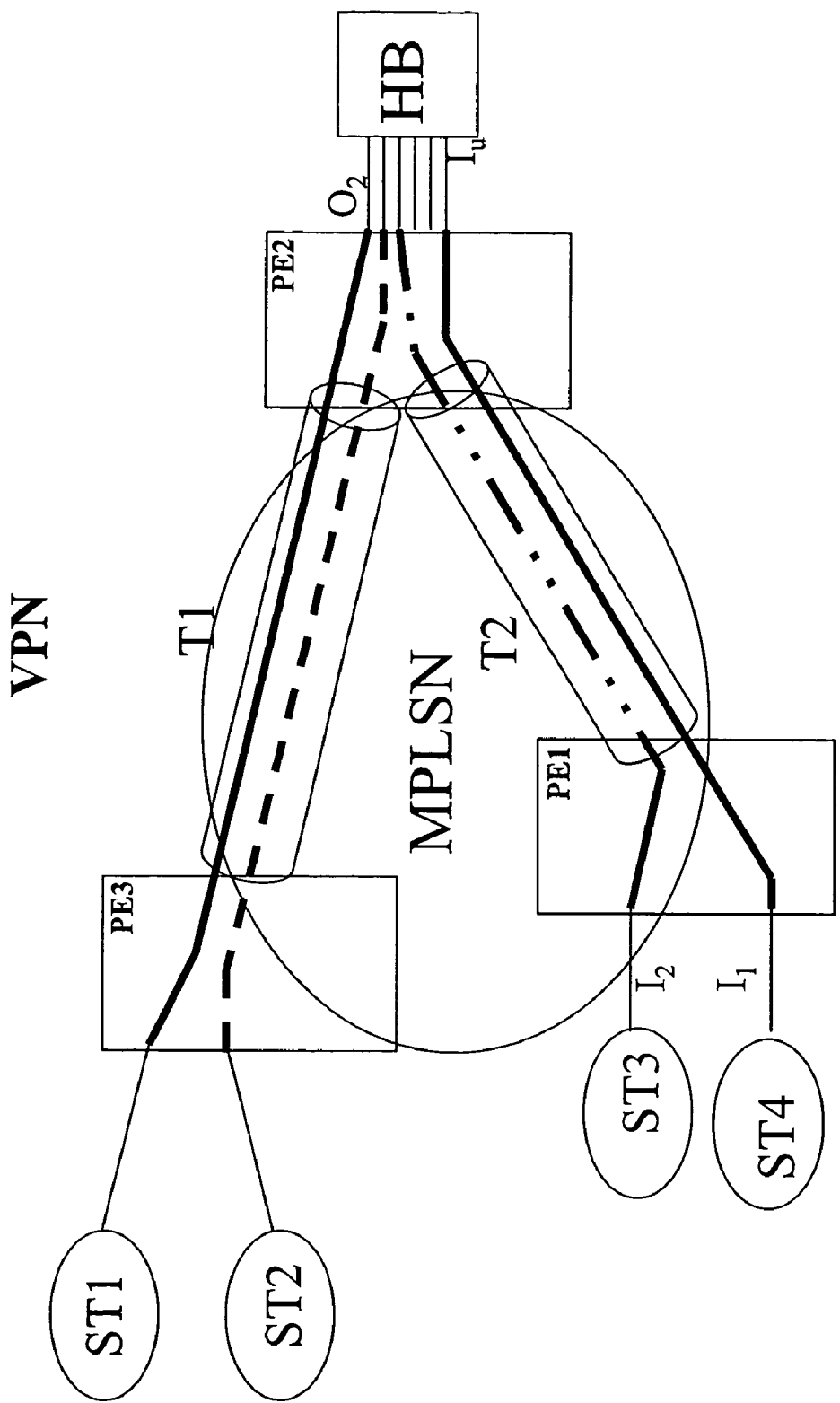
FIG. 1 represents a part of a Virtual Private Network
Figure 2:
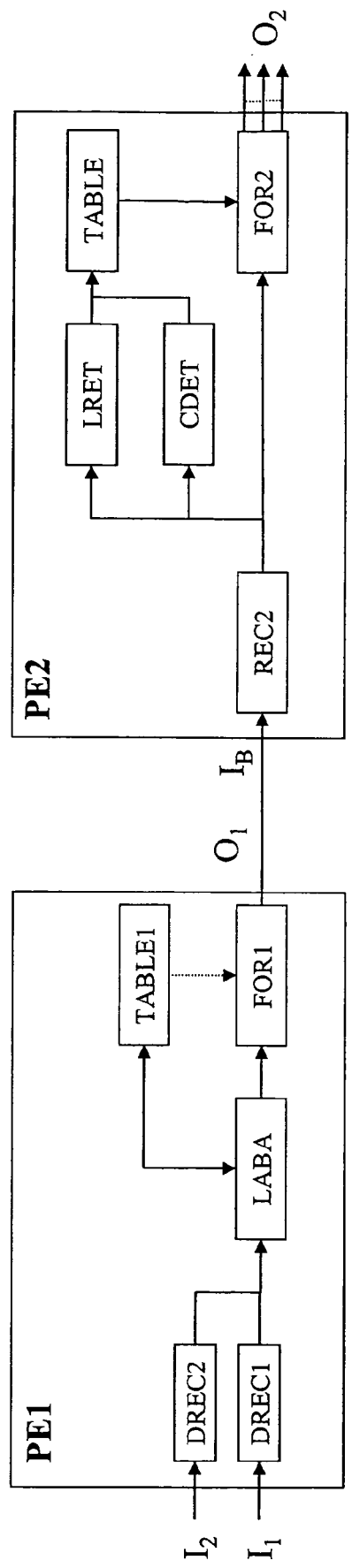
FIG. 2 represents the functional structure of a first Provider Edge Device PE1 and a second Provider Edge Device PE3 as presented in FIG. 1.

In the following paragraphs, referring to the drawings, an implementation of the label distribution method and the related Multiprotocol Label Switching Network Elements according to the present invention will be described. In the first paragraph of this description the main elements of the Virtual Private Network VPN as presented in FIG. 1 are described. In the second paragraph, all connections between the before mentioned elements and described means are defined. Subsequently all relevant functional means of the mentioned network elements as presented in FIG. 2 are described followed by a description of all interconnections. In the succeeding paragraph, the actual execution of the method for session establishment is described.

The essential elements of the present invention presented in the Virtual Private Network VPN as presented in FIG. 1 are the Provider Edge Devices PE1, PE2, PE3 each implemented by an Label Edge Router, a number of sites ST1, ST2, ST3, ST4 all forming part of the Virtual Private Network VPN, a hub HB for connecting all segments of the Virtual Private Network, which are the respective sites ST1, ST2, ST3, ST4, together and a Multiprotocol Label switching Network.

The Provider Edge Devices PE1, PE2, PE3 are able to forward incoming data from a Virtual Private network site via the Multiprotocol Label switching Network towards the Hub HB using a label, identifying the context of the data-packets.

Although there is usually a plurality of Virtual Private Network sites, only four Virtual Private Network sites ST1, ST2, ST3, ST4 is described in this embodiment for reasons of simplicity.

Each of the Virtual Private Network sites ST1, ST2, ST3, ST4 is coupled to the respective Provider Edge device over a layer 2 connection such as ATM or Frame Relay. Virtual Private Network Sites ST1, ST2 are coupled to the Provider Edge Device PE3, Virtual Private Network Sites ST3, ST4 are coupled to the Provider Edge Device PE1. The Hub is coupled with a number of interfaces to the respective outputs O2 of the Provider Edge Device PE2. Each of the outputs O2 of the provider edge device PE2 is coupled to an interface of the Hub HB. The interfaces of the Hub are also coupled to the Provider Edge device PE2 over a layer 2 connection such as ATM or Frame Relay for each interface of said Hub HB. The Provider Edge devices are coupled via the Multiprotocol Label Switching Network MPLSN. In this embodiment a connection over the Multiprotocol Label Switching Network between Provider Edge Element PE2 and Provider Edge Element PE3 is already established using a Multiprotocol Label Switching tunnel T1.

In order to emulate the layer-2 connections over the MPLSN, every layer-2 connection will be identified in the tunnel by means of a "multiplexing field" that is most often an MPLS label.

Furthermore, a connection is established between Provider Edge Element PE1 and Provider Edge Element PE2 using tunnel T2. In this embodiment it is assumed that each of the couplings between the Virtual Private Network Sites ST1, ST2, ST3, ST4 and the Hub HB on one side and the respective Provider Edge Devices PE1, PE2, PE3 on the other side are implemented using ATM.

The functional built-up of the first Provider Edge Device PE1 and the second Provider Edge Device PE2D is presented in FIG. 2.

The essential elements, for explanation of the present invention, of the first Provider Edge Device PE1 are the reception parts DREC1, DREC2 that are able to receive data-packets from the corresponding Virtual Private Network Sites ST3, ST4 and a label assigning part LABA that is able to assign a certain label, that is a label that is not yet assigned to data-packets from another flow, to each of the data-packets belonging to one single flow (in this embodiment, these data-packets DP1 . . . DPx originate from Virtual Private Network Site ST4). Data-packets originating from another Virtual Private Network Sites ST3, ST4 are assigned a different label identifying the originating user, or example the respective Label B for the Virtual Private Network Site ST3, and Label C for packets originating from the respective Virtual Private Network Site ST4. Further, it is relevant that a label assigned to packets of a certain flow is a label that is not yet assigned to data-packets of another flow.

The first Provider Edge Device PE1 further comprises a forwarding part FOR1 which is adapted to at first encapsulate the data-packets In Multiprotocol Label Switching data-packets and forward these Multiprotocol Label Switching data packets of the single flow towards the second Provider Edge Device PE2.

The memorizing part TABLE1 is able to memorise a coupling between an origin of the first data-packet of the single flow of data-packets and the unused label.

In this embodiment it is assumed that these data-packets are ATM packets and that the label assigning part LABA assigns a label to each of the data-packets DP1 . . . DPx originating from Virtual Private Network Site ST4

The essential elements, for explanation of the present invention, of the second Provider Edge Device PE2 are a reception part REC2 that is adapted to receive Multiprotocol Label Switching data-packets for instance the single flow forwarded by the first Provider Edge Device PE1 or the third provider Edge Device PE3 and to decapsulate these data-packets and a label retrieving part LRET that is adapted to retrieve from these decapsulated data-packets the label included in the data-packets.

The second Provider Edge Device PE2 further comprises a context determining part retrieving part CDET that is able to determine a context for the flow of data-packets identified by a certain label by applying a predetermined algorithm and a holding part TABLE, that is able to memorise the coupling between the retrieved label and the context of the flow and to hold this label coupled together with the context for the first packet in the data-flow. For data-packets that arrive with a label that is already contained in TABLE, the coupling maintained in TABLE will identify the context of the data-packets. For data-packets that contain a label that is not yet maintained in the holding part TABLE, the context determining part CDET will determine a new context by applying a predetermined algorithm. The predefined algorithm will define to which of the unused egresses at the Hub HB the packets with the newly received label will be sent. Examples for the algorithm are, choosing a random unused outgoing layer-2 connection to the Hub HB or choosing the next unused layer-2 connection with the lowest interface-identifier; or establishing a new layer-2 connection with the Hub HB by using a layer-2 UNI protocol (User-to-Network-Interface).

The Reception Part REC2 has an input-terminal that is at the same time an input-terminal $I_B$ of the Second Provider Edge Device PE2 and has an output-terminal that is coupled to an input-terminal of the label retrieving part LRET and at he same time coupled to an input-terminal of the context determining part CDET. The holding part TABLE is coupled with an input to an output of both the label retrieving part LRET and the context determining part CDET. Further, the holding part TABLE has an output-terminal that is coupled to an input-terminal of the Forwarding Part FOR2. Additionally there is a coupling between the receiving part REC2 and the forwarding part FOR2. The forwarding part FOR2 has a number of output-terminals that which are at the same time an output-terminals characterised by $O_2$ of the Second Provider Edge Device PE2.

In order to explain the execution of the present invention it is assumed that a new site ST4 is to be added to the Virtual Private Network. It is assumed that the new site ST4 is coupled over a ATM link to the first Provider Edge Device PE1 and that there is not yet a connection through tunnel T2 established between the first and the second Provider Edge Devices.

It is assumed that Virtual Private Network Site ST4 forwards data-packets towards the first Provider Edge Device PE1. As the site ST4 is coupled to a reception part DREC1, this receiving part DREC1 receives these packets and subsequently, at detection of a new flow not yet being assigned a label, forwards these packets to the label assigning part LABA that assigns an unused Label. The unused label is a label that is not yet assigned to and used for identifying the context of data-packets of another flow. Now assume that a label A is not yet in use and is assigned to each of these data-packets of this flow. Upon receipt of the first data-packet from a certain user terminal of this Virtual Private Network Site ST4, the label assigning part LABA of the first Provider Edge Device PE1 assigns an unused label, which is a label not yet assigned to a data-packet of a data-flow. [For each other Input-terminal, different label identifying the input-terminal and as a consequence the connected User Terminal Virtual Private Network Site ST4, will be chosen]. These data-packets including the label A are directed towards the forwarding part FOR1, that encapsulates each of the ATM data-packets in corresponding MPLS data-packets and subsequently tunnels the MPLS data-packets over the connection through tunnel T2 towards the second Provider Edge Device PE2. The reception part REC2 of the Second Provider Edge Device PE2 receives these MPLS data-packets and subsequently decapsulates them. The included ATM data-packets are directed to the forwarding part FOR2. In the mean time the label retrieving part LRET, retrieves from each of the data-packets of the single flow the label A that is included therein. The label determining part LDET discovers that the label is a new one, which is not yet known at the second Provider Edge Device PE2.

Subsequently the context determining part CDET determines the context of the first packet of the single flow of data-packets by applying a predetermined algorithm. This algorithm checks which input of the Hub HB coupled to the Second Provider Edge Device PE2 is not yet in use and subsequently determines that the packets of the flow are forwarded to that unused interface $I_U$ of The Hub HB. Here the context is that each incoming data-packet carrying the Label A will be forwarded to this unused interface $I_U$. This interface $I_U$ is the context determined by the algorithm.

Other examples for the algorithm, for determining to which of the unused egresses at the Hub HB the packets with the newly received label will be send are, choosing a random unused outgoing layer-2 connection to the Hub HB or choosing the next unused layer-2 connection with the lowest interface-identifier; or establishing a new layer-2 connection with the Hub HB by using a layer-2 UNI protocol (User-to-Network-Interface).

In this case the context is that the data-packets of the flow are destined at a certain input interface of the Hub HB, interface. The holding part TABLE, that first makes the coupling of the retrieved label and the determined context and secondly hold this label coupled together with the context determined by applying the predetermined algorithm data-packet DP1. This determined context and the unused label A will identify a flow of data-packets originating at the site ST4 or heading to the site ST4

For each subsequent data-packet also containing the same label, label A, the Second Provider Edge Device PE2 recognizes that each of these packets belongs to the same flow as data-packet DP1 and it is destined towards interface $I_U$ of Hub HB via an ATM connection between the Hub HB and the second Provider Edge Device.

In order to send packets from the second Provider Edge Device PE2 towards the first Provider Edge Device PE1 carrying the same label as in the other direction, the unused Label, Label A, the memorising part TABLE1 is able to memorise a coupling between an origin of the first data-packet of said single flow of data-packets and the unused label, Label A. Based on this knowledge the first Provider Edge Device PE1 is able to forward the data packets carrying label A to the origin of the first data-packet of the single flow of data-packets, which is Virtual Private Network VPN Site 4.

It is to be noted that in this scenario, it doesn't matter which attachment circuit from PE1 is connected to which attachment circuit from PE2, as long as they belong to the same VPN, and as long as once the binding is made, it remains the same for the life-time of the VPN. Naturally, also in this scenario, for reverse traffic, the same label should be used.

It is further to be noticed that the label enables the differentiation between the different user terminal sessions sending data-packets towards the second Provider Edge Device PE2. Data-packets of each different flow, each originating at a different Virtual Private Network site ST1, ST2, ST3 and ST4 will be assigned a different label. These different labels facilitate the first Provider Edge Device PE1 and the Second Provider Edge Device PE2 to distinguish between the data-packets of the different data-flows and Virtual Private Network sites corresponding User Terminals.

It is to be remarked that although the present invention is described in the context of a Virtual Private Networks, the same mechanism can be applied when migrating Layer-2 core networks towards MPLS-based or IP-based core networks, or when doing Layer-2 mediation over MPLS networks, or even when interconnecting parts of a Service Provider's ATM Network using a transit carrier's MPLS backbone network.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. Label distribution method for distributing a label between a first Multiprotocol Label Switching network element (PE1) and a second peering Multiprotocol Label Switching network element (PE2) in a Multiprotocol Label Switching network (MPLSN), said label identifying a context of a single flow of data-packets, forwarded from said first Multiprotocol Label Switching network elements (PE1) towards said second peering Multiprotocol Label Switching network element (PE2), said method comprising:
   causing said first Multiprotocol Label Switching network element (PE1) to add an unused label to a first data-packet (DP1), of said single flow before forwarding said single flow; said unused label not yet associated with or used for identifying a context of said single flow;
   causing said second Multiprotocol Label Switching network element (PE2), to determine a context of said single flow of data-packets by applying a predetermined algorithm if a label in said first packet of said single flow is said unused label; and
   causing said second Multiprotocol Label Switching network element (PE2) to couple said unused label and said context, determined by applying said predetermined algorithm.

2. Label distribution method according to claim 1, wherein said method further comprises the step of causing said first Provider Edge Device (PE1) to memorize a coupling between an origin of said first data-packet (DP1) of said single flow of data-packets and said unused label.

3. First Multiprotocol Label Switching Network Element (PE1) for use in a Multiprotocol Label Switching network (MPLSN), wherein a label is distributed between said first Multiprotocol Label Switching network element (PE1) and a second peering Multiprotocol Label Switching network element (PE2) in said Multiprotocol Label Switching network (MPLSN), said label identifying a context of a single flow of data-packets, forwarded from said first Multiprotocol Label Switching network elements (PE1) towards said second peering Multiprotocol Label Switching network element (PE2), said first Multiprotocol Label Switching Network Element (PE1) comprising:
   a. a forwarding part (FOR1), adapted to forward said single flow of data-packets from said first Multiprotocol Label Switching Network element (PE1) towards said second Multiprotocol Label Switching network element (PE1), CHARACTERISED IN THAT said first Multiprotocol Label Switching Network Element (PE1) comprises a label assigning part (LABA), coupled with an output to an input of said forwarding part (FOR1) and adapted to assign an unused label to each data-packet of said single flow of data-packets; said unused label not yet associated with or used for identifying a context of said single flow.

4. First Multiprotocol Label Switching Network Element (PE1) according to claim 3 wherein, said First Multiprotocol Label Switching Network Element (PE1) comprises a memorizing part (TABLE1), adapted to memorise a coupling between an origin of said first data-packet DP1 of said single flow of data-packets and said unused label.

5. Second Multiprotocol Label Switching Network Element (PE2) for use in a Multiprotocol Label Switching network (MPLSN), wherein a label is distributed between a first Multiprotocol Label Switching network element (PE1) and said second peering Multiprotocol Label Switching network element (PE1) in said Multiprotocol Label Switching network (MPLSN), said label identifying a context of a single flow of data-packets, forwarded from said first Multiprotocol Label Switching network element (PE1) towards said second peering Multiprotocol Label Switching network element (PE1), said second Multiprotocol Label Switching Network Element (PE2) comprising the following parts:
   a reception part (REC2) adapted to receive data-packets of said single flow of data-packets; and
   a label retrieving part (LRET), coupled with an output to an input of said reception part (REC2) and adapted to retrieve from at least said first data-packet (DP1) of said single flow of data-packets an unused label included therein, said unused label not yet associated with or used for identifying a context of said single flow; wherein said Multiprotocol Label Switching Network Element (PE1) further comprises:
   a context determining part (CDET), coupled with an output to an input of said reception part (REC2) and adapted to determine a context of said single flow of data-packets by applying a predetermined algorithm if a label in said first packet of said single flow is said unused label; and
   a holding part (TABLE), coupled with an input to an output of both said label retrieving part (LRET) context determining part (CDET) and adapted to hold a coupling of said unused label and said context determined by applying said predetermined algorithm.

6. Second Multiprotocol Label Switching Network Element (PE2) according to claim 5, CHARACTERISED IN THAT said predetermined algorithm is adapted to randomly assign an output of said Second Multiprotocol Label Switching Network Element (PE2) to said context.

7. Second Multiprotocol Label Switching Network Element (PE2) according to claim 5, CHARACTERISED IN THAT said predetermined algorithm is adapted to assign an unused output of said Second Multiprotocol Label Switching Network Element (PE2) having the lowest interface-identifier to said context.

8. Second Multiprotocol Label Switching Network Element (PE2) according to claim 5, CHARACTERISED IN THAT said predetermined algorithm is adapted to assign an unused output of said Second Multiprotocol Label Switching Network Element (PE2) by using User-to-Network-Interface Protocol to said context.

9. Label distribution method according to claim 1, wherein the predetermined algorithm is implemented by randomly assigning an output of said Second Multiprotocol Label Switching Network Element (PE2) to said context.

* * * * *